(12) United States Patent
Bangali et al.

(10) Patent No.: US 10,474,978 B2
(45) Date of Patent: Nov. 12, 2019

(54) SYSTEMS AND METHODS FOR COMMUTE ANALYSIS AND MODELING

(71) Applicant: ADP, LLC, Roseland, NJ (US)

(72) Inventors: Kishore Bangali, Lake Hiawatha, NJ (US); Sachin V. Havaldar, Madison, NJ (US); Marc Rind, Summit, NJ (US); Xiaojing Wang, Warren, NJ (US)

(73) Assignee: ADP, LLC, Roseland, NJ (US)

( * ) Notice: Subject to any disclaimer, the term of this patent is extended or adjusted under 35 U.S.C. 154(b) by 778 days.

(21) Appl. No.: 14/698,146

(22) Filed: Apr. 28, 2015

(65) Prior Publication Data

US 2016/0321590 A1    Nov. 3, 2016

(51) Int. Cl.
  *G06Q 10/00*    (2012.01)
  *G06Q 10/06*    (2012.01)
(52) U.S. Cl.
  CPC .............. *G06Q 10/06393* (2013.01)
(58) Field of Classification Search
  None
  See application file for complete search history.

(56) References Cited

U.S. PATENT DOCUMENTS

| 6,247,005 | B1 * | 6/2001 | Edwards | G06Q 40/02 706/47 |
| 7,480,659 | B2 * | 1/2009 | Chmura | G06Q 10/06 |
| 8,103,445 | B2 * | 1/2012 | Smith | G09B 29/007 340/995.14 |
| 9,240,967 | B2 * | 1/2016 | Mansfield | H04L 51/32 |
| 2006/0085455 | A1 * | 4/2006 | Chmura | G06Q 10/06 |
| 2006/0136126 | A1 * | 6/2006 | Coombes | G09B 29/10 701/532 |
| 2006/0217876 | A1 * | 9/2006 | Houri | G06Q 10/06 701/533 |

(Continued)

FOREIGN PATENT DOCUMENTS

WO    WO-2008066518    6/2008

OTHER PUBLICATIONS

Phillips, "An Employee Commute Analysis", Vulcan Materials Company, http://www.vulcanmat.com/, 1998, 2 pages.

(Continued)

*Primary Examiner* — Joseph M Waesco
(74) *Attorney, Agent, or Firm* — Andrew M. Calderon; Roberts Mlotkowski Safran Cole & Calderon P.C.

(57) ABSTRACT

A method and system for analyzing employee retention across an enterprise based on commuter modeling is disclosed. The method can be implemented in a computer system which includes: mapping longitudinal and latitudinal coordinates of address information of a plurality of employees and a work location onto a map, which shows a predefined geographic location encompassing the work location surrounded by the longitudinal and latitudinal coordinates of the address information; obtaining calculated analytics data of employee turnover rate for the plurality of employees based on a commute distance from the work location to each of the longitudinal and latitudinal coordinates of the plurality of employees; and graphically overlaying the analytics data of the turnover rate for the plurality of employees onto the map to show employee turnover rate for different segments of the map.

14 Claims, 7 Drawing Sheets

(56) References Cited

U.S. PATENT DOCUMENTS

| | | | | |
|---|---|---|---|---|
| 2007/0276595 | A1* | 11/2007 | Lewinson | G01C 21/3438 701/533 |
| 2009/0076987 | A1* | 3/2009 | Chmura | G06Q 10/06 706/11 |
| 2010/0211516 | A1* | 8/2010 | Andrekovich | G06Q 10/10 705/321 |
| 2011/0074783 | A1* | 3/2011 | Coombes | G09B 29/10 345/426 |
| 2011/0267355 | A1* | 11/2011 | Coombes | G09B 29/10 345/441 |
| 2012/0136568 | A1* | 5/2012 | Garrigan | G01C 21/20 701/428 |
| 2012/0158445 | A1* | 6/2012 | Dufford | G06Q 10/063 705/7.11 |
| 2013/0024105 | A1* | 1/2013 | Thomas | H04W 4/023 701/410 |
| 2013/0030873 | A1* | 1/2013 | Davidson | G06Q 10/06 705/7.36 |
| 2013/0103312 | A1* | 4/2013 | Coombes | G09B 29/10 701/532 |
| 2013/0173343 | A1* | 7/2013 | Algranati | G06Q 30/0203 705/7.32 |
| 2013/0268353 | A1* | 10/2013 | Zeto, III | G06Q 30/02 705/14.45 |
| 2013/0325979 | A1* | 12/2013 | Mansfield | H04L 51/32 709/206 |
| 2014/0078149 | A1* | 3/2014 | Coombes | G09B 29/10 345/440 |
| 2014/0122164 | A1* | 5/2014 | Lucara | G06Q 10/047 705/7.28 |
| 2014/0213300 | A1* | 7/2014 | Spears | H04W 4/029 455/456.3 |
| 2014/0214991 | A1* | 7/2014 | Mansfield | H04L 51/32 709/206 |
| 2014/0365406 | A1* | 12/2014 | Miller | G06Q 10/00 706/11 |
| 2015/0009219 | A1* | 1/2015 | Rubin | G06T 11/206 345/441 |
| 2015/0026088 | A1* | 1/2015 | Alber | G06Q 50/265 705/325 |
| 2015/0148060 | A1* | 5/2015 | Parab | H04W 4/021 455/456.1 |
| 2015/0172248 | A1* | 6/2015 | Mansfield | H04L 51/32 709/206 |
| 2016/0018240 | A1* | 1/2016 | Kritt | G01C 21/3667 345/629 |
| 2016/0050535 | A1* | 2/2016 | Mansfield | H04W 4/025 455/456.3 |
| 2016/0092990 | A1* | 3/2016 | Dziuba | G06Q 40/08 705/4 |
| 2016/0180746 | A1* | 6/2016 | Coombes | G09B 29/10 382/100 |

OTHER PUBLICATIONS

Schwanen et al., "Travel-time ratios for visits to the workplace: the relationship between . . . work duration", Pergamon, Transportation Research Part A 36, 2002, pp. 573-592.

\* cited by examiner

SYSTEMS AND METHODS FOR COMMUTE ANALYSIS AND MODELING

TECHNICAL FIELD

The invention relates to commuter analysis and, more particularly, to a method and system for analyzing employee retention across an enterprise based on commuter modeling.

BACKGROUND

Voluntary turnover of employees has a negative impact on a company's productivity and revenue, amongst other metrics. For example, recruiting and training a new employee is time consuming and costly, not to mention the lost productivity of a more experienced employee. Many studies, in fact, have gauged the cost of employee turnover, with some estimating that it can cost upwards of six to nine months of salary on average. These costs can even be more, especially for highly educated and trained individuals. So, employee retention is an important aspect of any company planning.

SUMMARY

In a first aspect of the invention, a method implemented in a computer system comprises: mapping longitudinal and latitudinal coordinates of address information of a plurality of employees and a work location onto a map, which shows a predefined geographic location encompassing the work location surrounded by the longitudinal and latitudinal coordinates of the address information; obtaining calculated analytics data of employee turnover rate for the plurality of employees based on a commute distance from the work location to each of the longitudinal and latitudinal coordinates of the plurality of employees; and graphically overlaying the analytics data of the turnover rate for the plurality of employees onto the map to show employee turnover rate for different segments of the map.

In another of the invention, a computer system for generating an employee retention model comprises a hardware memory device that stores program instructions and a processor that executes the program instructions and causes the computer system to: map longitudinal and latitudinal coordinates of address information of a plurality of employees and a work location onto a map, upon selection of the work location; extract analytics data of employee turnover rate for the plurality of employees associated with a commute distance from the work location to each of the longitudinal and latitudinal coordinates of the plurality of employees; and generate an overlay of the extracted analytics data on the map which graphically represents employee turnover rate for different segments of the map centered about the work location. The program instructions are stored on computer readable storage medium for execution by a CPU via computer readable memory.

In a further aspect of the invention, a computer program product comprises computer readable program instructions stored on non-transitory computer readable storage medium. The computer readable program instructions causing a computing device to: extract address information of a plurality of employees from a database using one or more service APIs; convert the address information into longitudinal and latitudinal coordinates using geocode service APIs; upon selection of a selectable work location provided on a map: plot the longitudinal and latitudinal coordinates of the plurality of employees onto the map, surrounding the selectable work location; extract an employee termination rate for the plurality of employees associated with a commute distance from the work location to each of the longitudinal and latitudinal coordinates of the plurality of employees; draw defined segments on the map which centers about the selectable work location and which includes at least some of the longitudinal and latitudinal coordinates within the defined segments; and post data of the turnover rate for each segment of the map graphically showing a percentage of the employee termination rate for each segment based on the commute distance.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF ASPECTS OF THE INVENTION

The invention relates to commuter analysis and, more particularly, to methods and systems for analyzing employee retention across an enterprise based on commuter modeling. In accordance with more specific aspects of the invention, the methods and systems described herein analyze commute distances of employees in order to model employee retention and flight risks. The modeling can be implemented in combination with other metrics such as, for example, job title, job description, years of employment, gender, etc.

Advantageously, the modeling will assist an employer or other management personnel to understand which employees are at a higher risk of leaving a company based on commute distance, in addition to other metrics. The modeling can be used as a predictive analytical or planning tool to determine which locations may be suitable for new office locations and which department would be best suited to be hosted within the new locations based on retention rates of employees, commute distances, etc. The modeling can also be used as a predictive analytical or planning tool to determine which employees would statistically be the most desirable person to hire based on a possible retention rate, compared to other potential hiring for the same position. This modelling will thus significantly assist management in reducing terminations that occur due to commute distance, thereby saving considerable costs related to employee retention, the need for new hiring and training, etc.

Figure 1:
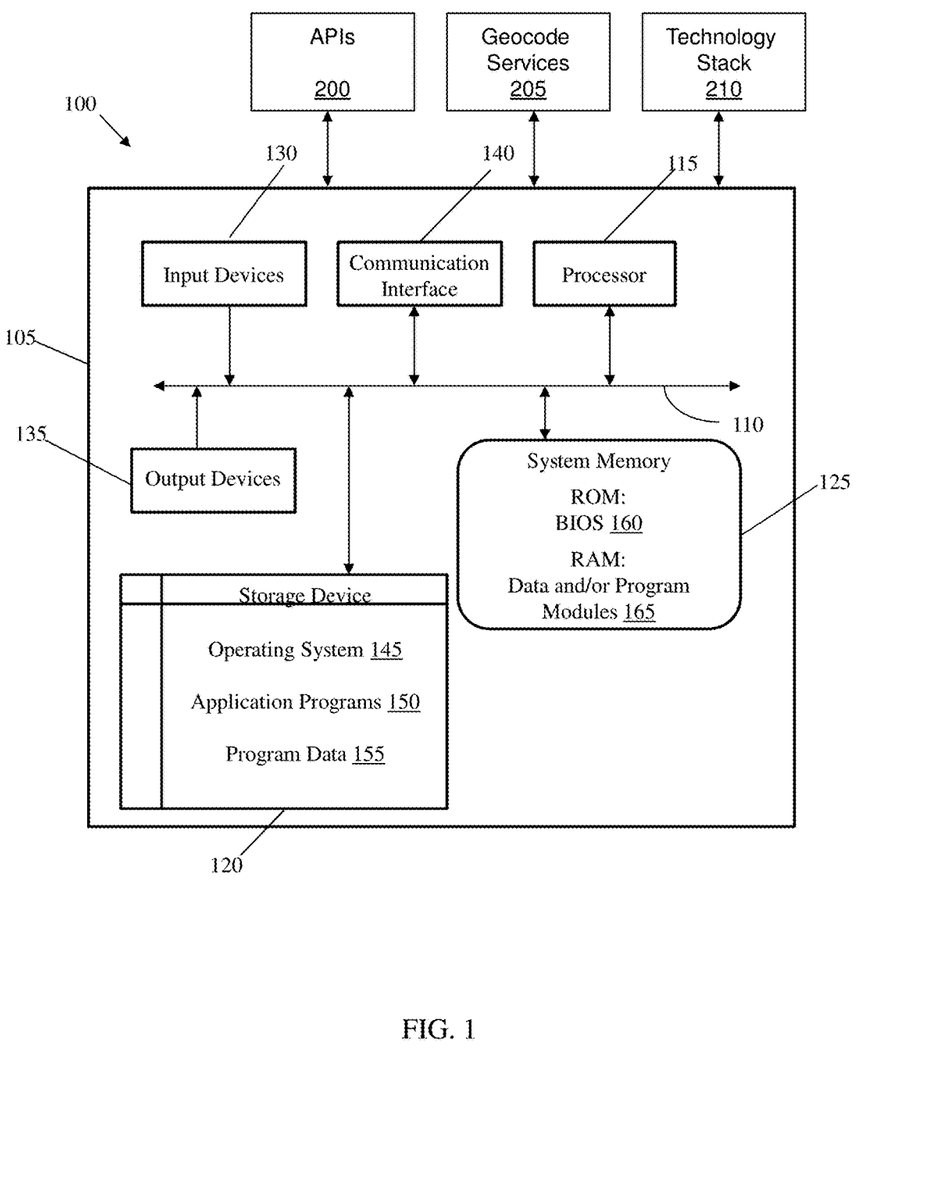
FIG. 1 is an illustrative architecture of a computing system implemented as embodiments of the present invention.

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present invention, which may be operatively implemented by the computer readable program instructions stored in program modules 165.

In embodiments, processor 115 (visa-vis the program modules 165) can extract or obtain employee information through the use of various application programming interfaces (APIs) 200. For example, the employee information can be extracted from off-site employer databases or systems, or internal databases which are connected to the computing system, e.g., storage device 120. In the former scenario, the employee information can be stored on the cloud and obtained through a network as described herein, e.g., Internet. The employee information can include, for example, residence address in addition to or in combination with gender, job title, job description, years of employment, termination date (if applicable), hiring date, department name and/or department location, amongst other pertinent information.

As should be understood by those of skill in the art, in computer programming an API is a set of routines, protocols, and tools for building software applications. An API expresses a software component in terms of its operations, inputs, outputs, and underlying types, and defines functionalities that are independent of their respective implementations, which allows definitions and implementations to vary without compromising each other. In addition to accessing databases or computer hardware, such as hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications. The API specification can take many forms, including POSIX, Microsoft Windows API, or the libraries of a programming language, e.g., Standard Template Library in C++ or Java API.

In addition, processor 115 can obtain mapping information through the use of a geocode service API 205. As should be understood by those of skill in the art, geocoding is the process of converting addresses into geographic coordinates (e.g., latitude and longitude coordinates), which can be used to place markers or position a map. In embodiments, processor 115 can obtain or extract mapping information from any open source geocoding service, e.g., Google Maps, in order to obtain coordinate information of the employee's residence as well as employer/work location. Accordingly, by using geocoding services, processor 115 can process or convert the residence address into latitude/longitude coordinates, as well as the latitude/longitude of the employer's location. With this information, processor 115 can overlay or plot the residence address and employee location onto a map, which can be graphically shown on display 135.

In embodiments, the geocoding information can be used in combination with other metrics, e.g., personnel information of the employee, for further analytics and modeling. This, in turn, provides a robust data management tool (visa-vis, e.g., processor 115 and/or program modules 165) to allow the user, e.g., employer or management personnel, to view many different analytics and map these analytics to many different scenarios to determine retention rates of employees based on commute distances. These analytics and models can be used as a planning tool to determine ideal office locations or employee hiring based on commute distances of the employees.

In embodiments, the fetching of analytics, mapping and overlay or plotting of features of a map, amongst other features and functions, can be provided by a technology stack 210. This technology stack 210 can include, e.g., a map module amongst other features described herein. By way of one illustrative, non-limiting example, the map module can be a Highcharts mapping module which is a charting library written in JavaScript. In embodiments, the charting library offers a process of adding maps to a website or web application or other graphical display, e.g., output device 135. The map module also allows the user the ability to plot a region or geographical place such as work locations, and make any of these points selectable for further analysis as described further herein.

In embodiments, the technology stack 210 further includes, e.g., geo-JSON specification. The geo-JSON specification can be used to convert the latitudinal and longitudinal information from the geoservice into specific coordinates for mapping into the map module. In this way, processor 115 can overlay or plot the coordinates directly onto a map. As should be understood by those of skill in the art, geo-JSON is a format for encoding a variety of geographic data structures.

In further embodiments, the technology stack 210 includes, e.g., jQuery. A jQuery is a feature-rich JavaScript library that makes things like HTML document traversal and manipulation, event handling, animation, and Ajax much simpler with an API that works across a multitude of browsers. In embodiments, the jQuery is used to plot additional information onto the map. For example, it is possible to plot concentric circles at certain radii or distances (e.g., 5 miles, 10 miles, 15 miles, etc.) from an employee location, in addition to lines from the employer location to the various employee residences. In this way, it is possible to graphically represent commute distances at discrete radii from a central location (e.g., work location), and determine a percentage of employee terminations within each of these concentric circles. The percentage of terminations can be calculated by processor 115 by (i) adding all employees within the certain radii that have been terminated, (ii) dividing that number by the total number employees within the same radii (circle) and (iii) multiplying by 100 to obtain a percentage turnover rate. The percentage of terminations can also be extracted from external databases for each of these concentric circles or other segments, upon the selection of a work location.

In embodiments, the line information can be color coded or otherwise distinguishable based on many different metrics. For example, certain colors can represent certain metrics such as:

Color 1: New Hire;
Color 2: Current employee;
Color 3: Terminated employee; and
Color 4: Job title or works within a certain department.

In this way, the employee information and commute distance can be visually analyzed and displayed, and using this information, a determination may be made related to retention rates of employees within certain commute distances alone or in combination with other metrics as described herein. Accordingly, the graphically rendered modeling of the present invention can be used to show many different models and/or analytics including employee information such as employer location, job description, years of employment, etc., and with this information now known, it is possible to display turnover percentage within certain segments (e.g., circles) around selected work location, etc., in combination with other information.

Still referring to FIG. 1, in embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention. In embodiments, storage device 120 may store operating system 145, application programs 150, and program data 155 in accordance with aspects of the present invention.

The system memory 125 may include one or more storage mediums, including non-transitory media such as flash memory, permanent memory such as read-only memory ("ROM"), semi-permanent memory such as random access memory ("RAM"), any other suitable type of physical and tangible storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM. In embodiments, the program modules 165 may include the program instructions for implementing the processes, steps, methods and/or functionality of the present invention.

The program instructions can be a computer program product including a computer readable storage medium (or media) having computer readable program instructions thereon for causing processor 115 to carry out aspects of the present invention. The computer readable storage medium can be a tangible device that can retain and store instructions for use by an instruction execution device. The computer readable storage medium may be any non-transitory storage system or device including, e.g., a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), etc., and any suitable combination of the foregoing. The computer readable program instructions described herein can be downloaded to respective computing/processing devices from the computer readable storage medium or to an external computer or external storage device via a network, for example, the Internet, a local area network, a wide area network and/or a wireless network.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to analyze employee retention across an enterprise based on commute distances, and using this information graphically model employee retention and flight risks. In particular, computing device 105 may perform tasks (e.g., processes, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
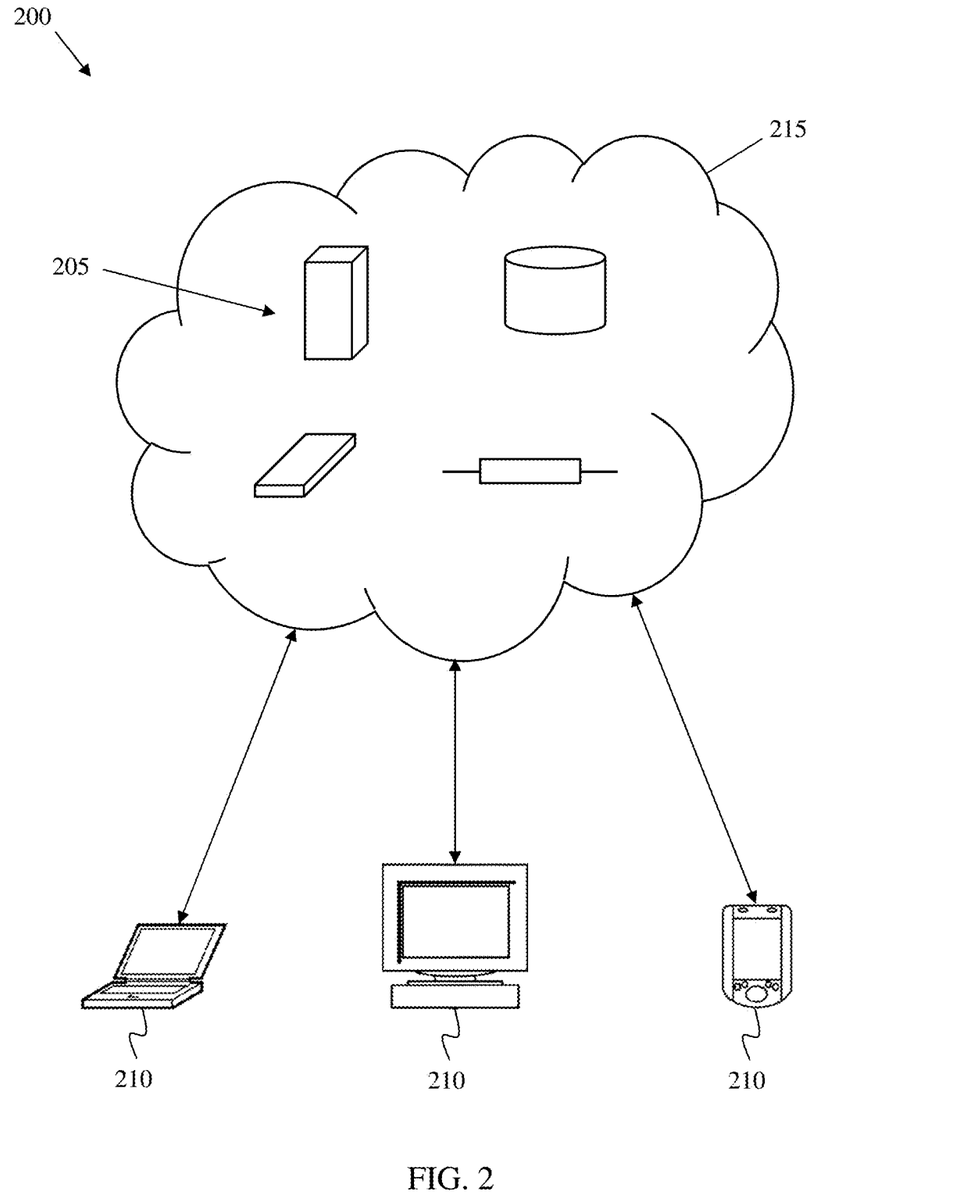
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

FIGS. 3-8 show example user interfaces or displays and underlying functionality in accordance with aspects of the present invention. In embodiments, the example displays illustrate the various user capabilities and functions of the present invention in order to provide improvements to hiring and other planning processes. In embodiments, the example displays can use touch screens (e.g., by touching, swiping, etc.), keypad inputs, and/or mouse selection inputs to select icons, buttons, images, and/or any other selectable portion of an example display. The example displays illustrate certain user actions and displays, e.g., the ability to touch, swipe, tap, and/or perform any other type of action.

In embodiments, the exemplary displays are illustrative of a system, a method, and/or a computer program product and related functionality implemented on the computing system of FIG. 1 or the cloud environment of FIG. 2, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing illustrative displays can be downloaded to respective computing/processing devices, e.g., computing system of FIG. 1 as already described herein, or implemented on a cloud infrastructure as described with regard to FIG. 2. Accordingly, the processes associated with each illustrative display of described herein can be representative of a process or flow, implemented by special purpose hardware-based systems that perform the specified functions or acts or carry out combinations of special purpose hardware and computer instructions as described herein.

Figure 3:
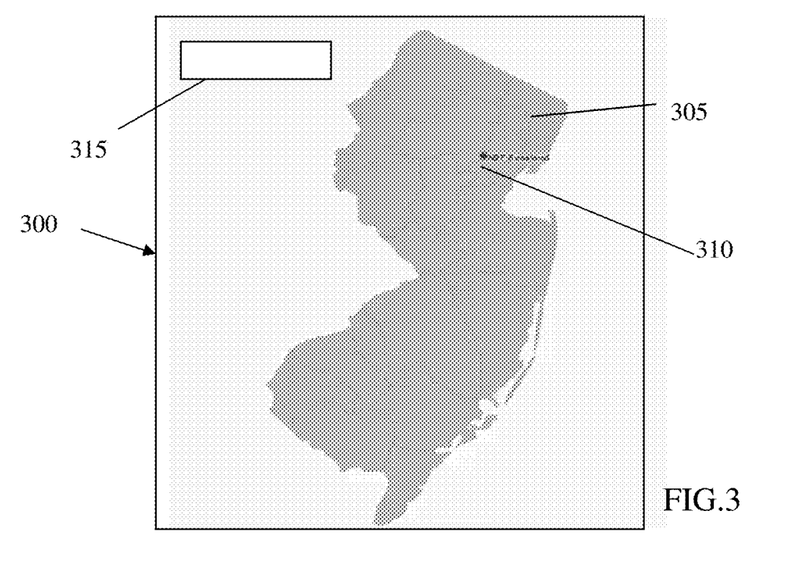
FIGS. 3-8 show example user interfaces or displays and underlying functionality in accordance with aspects of the present invention.

FIG. 3 shows an exemplary user display to begin the workflow process in accordance with aspects of the invention. In particular, user display 300 includes a map 305 with office location 310. In embodiments, the office location 310 can be provided by the user in a fillable field 315, and then overlaid onto the map in the manner already described herein. For example, a map module in combination with the technology stack can plot work locations as a selectable point within a certain region or geographical place represented by the map 305. By having the work location selectable, it is possible to expand this point to obtain further information about the work location including, e.g., address, departments housed at the work location (e.g., administrative, human resources, etc.), etc. In further embodiments, the selectable work location allows a user to change work locations and provide analytics around the new work location as described with regard to FIGS. 7 and 8.

Figure 4:
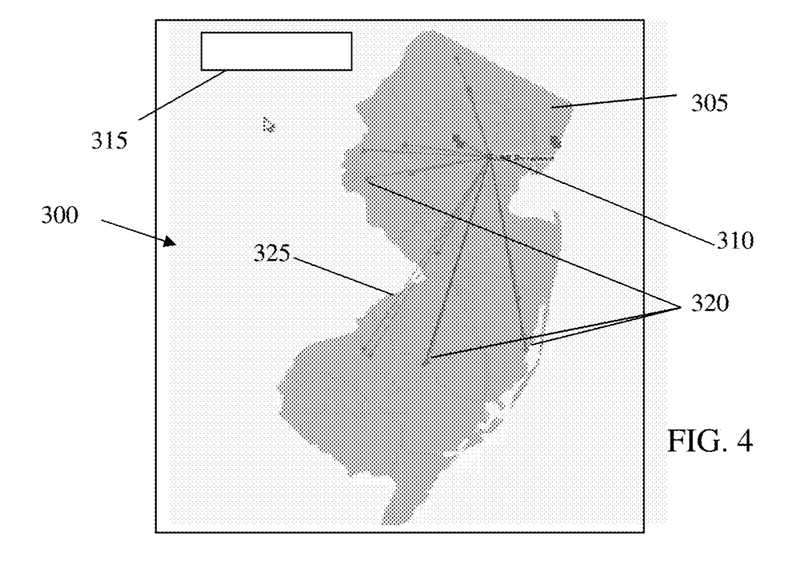

Moreover, as shown in FIG. 4, upon selection of the location 310, all employees 320 can be plotted on the graph (e.g., residence information is overlaid onto the map using coordinate systems). More particularly, by selecting a particular work location all the employees 320 working at that location are plotted on the map 305 and each employee is linked to the work location 305. As noted above, this can be accomplished using a geo-JSON file. That is, a geo-JSON specification can be used to convert the latitudinal and longitudinal information of the employee residence into specific coordinates for mapping into the map module.

In embodiments, the employee information can be categorized by departments or other information using color coded and/or dashed lines or other indicia as represented by reference numeral 325 and as described with regard to FIG. 1. As each employee is color coded based on the department or other information, a high level view of a department based distribution (or other distribution) can be established. For example, the lines 325 shown in FIG. 4 can be representative of the following employee information, e.g., sales, IT, management, etc. These lines 325 can also be representative of new hire, terminated employee, active employee, etc, each of which is mapped or associated to the employee using the processes described above, e.g., technology stack and APIs. Accordingly, the lines 325, as generated using the processes described herein, can be representative of many different metrics.

Figure 5:
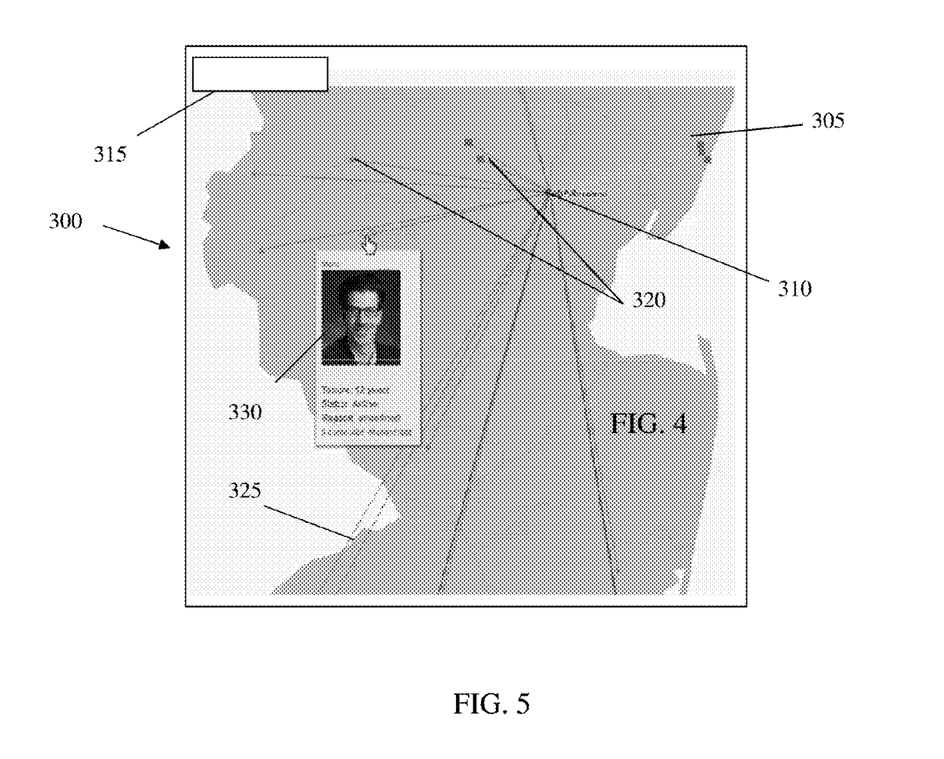

As shown in FIG. 5, the display 300 provides the user with the ability to zoom in to view employee information, as shown at reference 330. For example, by selecting a particular employee 320, it is now possible to view more granular employee information such as reasons for termination, e.g., commute distance, etc. Additional employee information can also be displayed, e.g., job description, hire date, termination date (if applicable), department assignment, manager, etc., any of which can assist management or human resources to ascertain information about the employee and use this information in other analytics. These other analytics or models can include not only commute distance but make additional links to other information which may be pertinent to termination risk or retention rate, e.g., job skills, management style, etc.

Figure 6:
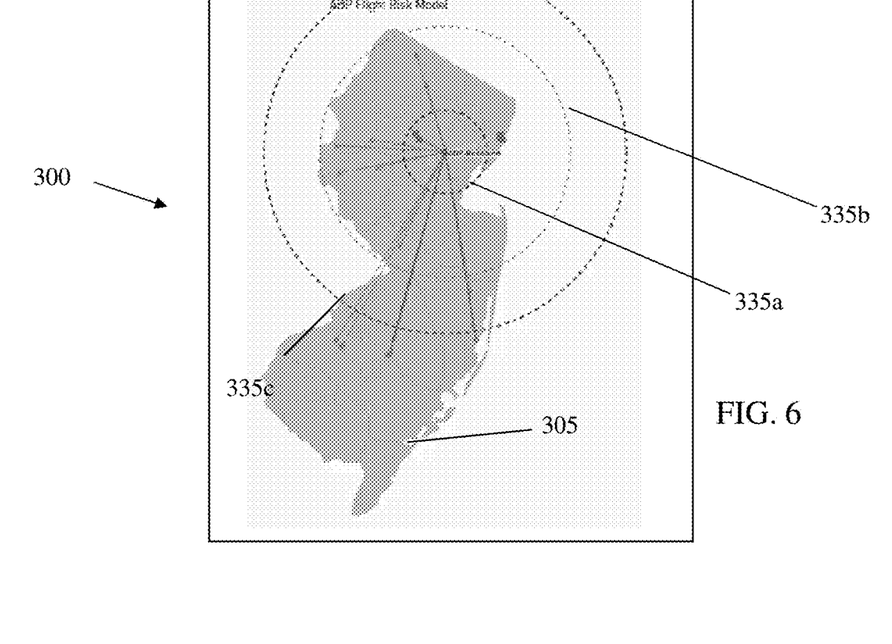

FIG. 6 shows the user interface 300 with a plurality of concentric circles 335a-c, centered about the work location 310. These circles 335a-c can be fetched and/or generated using the processes as described above, e.g., technology stack. More particularly, a JQuery can be used to fetch the circles and any analytic data, and then place these circles around the work location 310 in order to model a geographical representation of employees on a map using residence information and workplace address information.

In embodiments, each circle 335a, 335b, 335c can be centered a certain distance from the work location and can be mapped or associated to employee termination, in addition to a combination of other metrics within the confines of each circle. The employee termination can be represented as, e.g., a turnover rate percentage, based on commute distance. In this non-limiting illustrative example, (i) circle 335a is a 30 mile radius of work location 310 with a 20% turnover rate;
(ii) circle 335b is a 60 mile radius of work location 310 with a 25% turnover rate; and
(iii) circle 335c is a 90 mile radius of work location 310 with a 35% turnover rate.

In addition, using the color coded lines or other indicia, the turnover rate can be more granularly defined as a percentage to include commute distance and any combination of (i) years working, (ii) employment description or title, (iii) department in which the employee works, and/or (iv) new hire information, amongst other information.

Accordingly, these analytics show a turnover rate percentage with respect to commute distances alone or in combination with other information. And, as shown in the illustrative example, there is a clear indication that the longer commute distances have a higher turnover rate. This, in combination with other metrics such as other personal information, job description, etc., can be used by management or employees to predict overall turnover rate within certain segments of its employee population, thus providing a very granular showcase of employee turnover.

Figure 7:
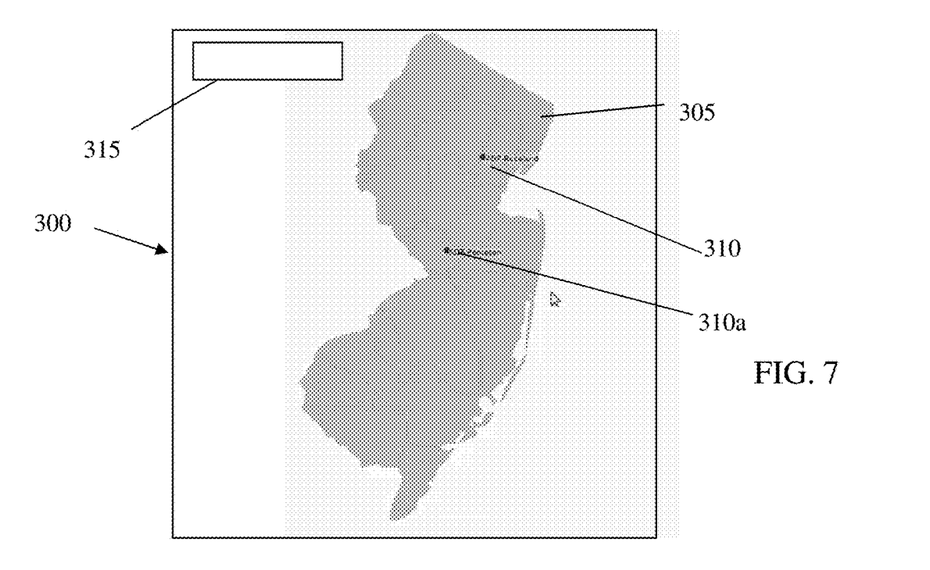

Also, by using these analytics, additional modeling can be used as a predictive analytical or planning tool to determine which locations may be best suited for new office locations and which department would be best suited to be hosted within the new locations, each of which can be based on retention rates of employees (based at least partly on commute distances, etc). For example, FIG. 7 shows a map overlaid with a new work location 310*a*. This new work location may be more advantageous, in that it will encompass more employees within a certain commute distance, as initially determined in FIG. 6.

Figure 8:
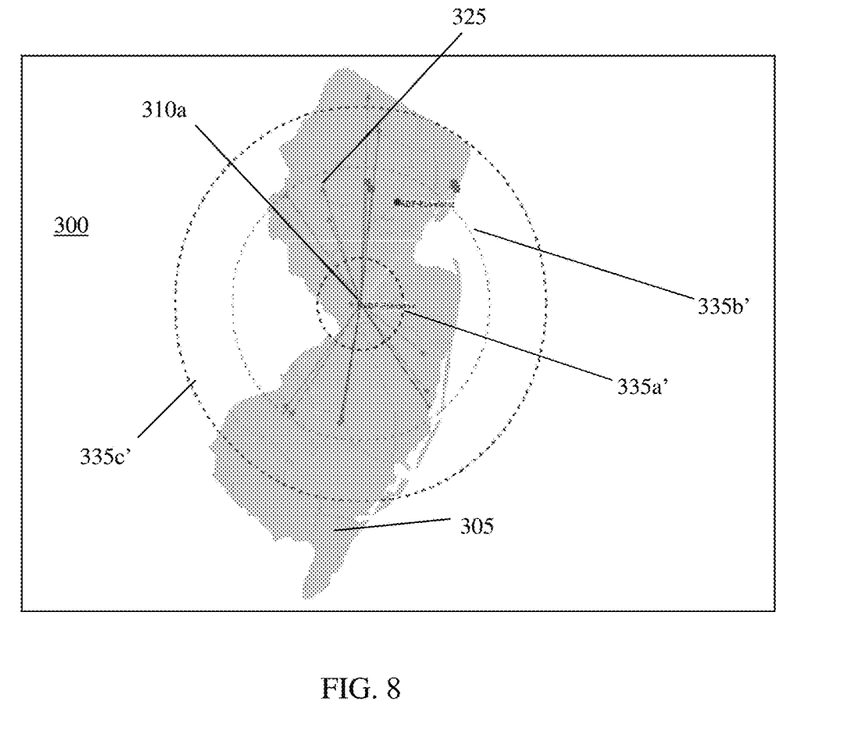

More specifically, as shown in FIG. 8, upon selection of a new location, the user interface 300 will be populated with a plurality of concentric circles 335*a'-c'* (fetched with appropriate analytics data of termination percentage as described herein), centered about the new work location 310*a*. These circles 335*a'-c'* are fetched and/or generated using the processes as described herein, e.g., technology stack. More particularly, a JQuery can be used to plot the circles around the new work location 310*a* in order to model a geographical representation of employees on a map using residence information and workplace address information. In this representation, using the same employee population, more employees are now captured within a 30 mile radius of work location 310*a* as represented by circle 335*a'*, with the lowest turnover rate.

Accordingly, these analytics show a turnover rate percentage with respect to commute distances on a new work location. That is, as the concentric circles moved based on a selection of a new work location, it is now possible to show the longitudinal and latitudinal coordinates falling within each of moved concentric circles to determine how many employees would have terminated employment based on a commute distance from the new work location. In this way, a predictive model has been created to show that the new location will allow shorter commute distances for certain employees of the employee pool, with a corresponding lower turnover rate for the employee pool. Thus, by comparing the displays shown in FIGS. 6 and 8, it is possible to view a shift in turnover for the employees at the new work location (compared to the original work location). This, in turn, provides a very powerful tool to predict employee turnover based on different work locations, thus helping management determine best locations to open a new office and which department can be hosted at such location, ultimately helping to reduce the terminations that happen due to commute distance.

Also, as a planning tool, the representation of FIG. 8 can be compared to other models (e.g., representation shown in FIG. 6) to determine which locations have higher turnover rates, etc. These different representations can be further be compared based on commute distance in combination with other metrics such as years of employment, department, etc.

Figure 9:
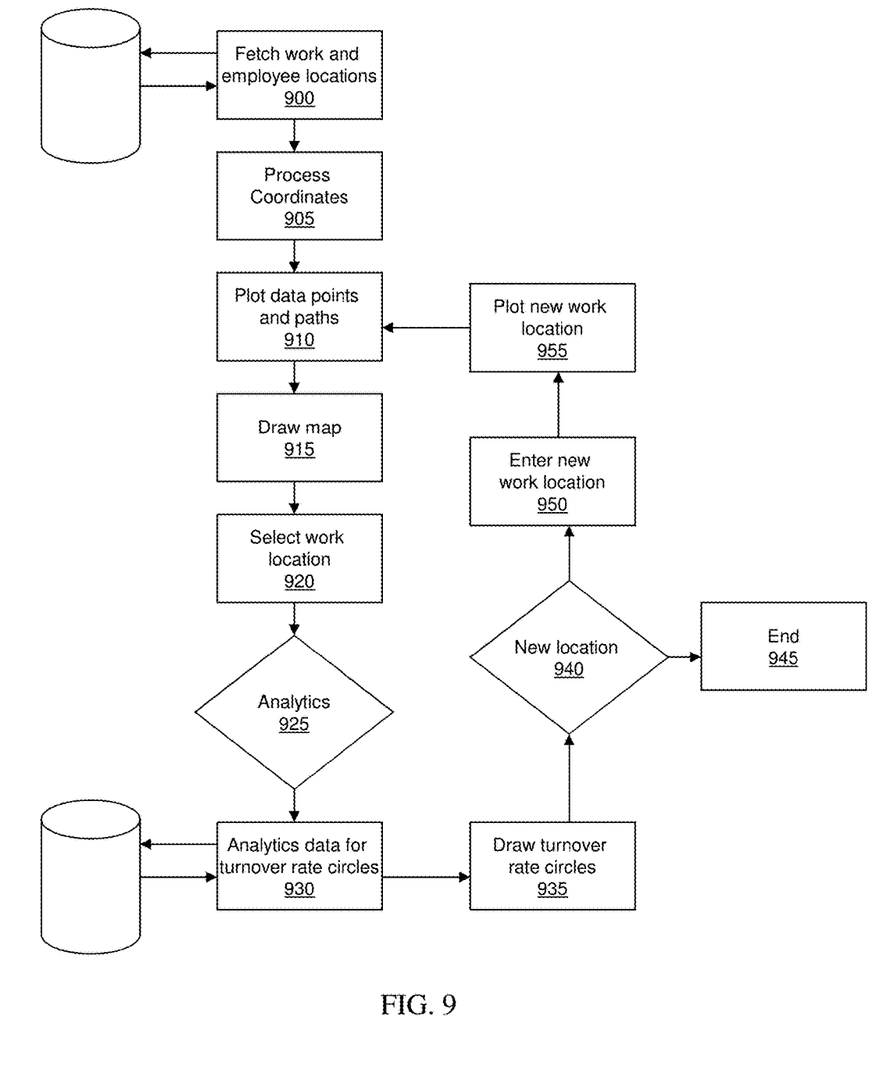
FIG. 9 depicts an exemplary flow for a process in accordance with aspects of the present invention.

FIG. 9 depicts an exemplary flow for a process in accordance with aspects of the present invention. The exemplary flow can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIG. 4 can be downloaded to respective computing/processing devices, e.g., computing system of FIG. 1 as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

Referring to FIG. 9, at step 900, the processes and/or systems fetch work location address and employee addresses. This can be accomplished through the use of API services, from external databases. At step 905, the processes and/or systems convert the address information into coordinates. At step 910, the processes and/or systems prepare a file to plot data points and paths onto a map. This can be performed using a geo-JSON file. At step 915, the processes and/or systems draw the map (e.g., stage or region) with existing and/or new work locations plotted on the map. At step 920, a user selects a work location at which time the geo-JSON file is used to plot the employees onto the map.

At step 925, the processes and/or systems begin the analytics. For example, at step 930, the processes and/or systems fetch analytics data for turnover rate circles and fetch turnover rate circles for certain distances, e.g., 20, 40 and 60 miles (although other distances and number of circles are contemplated by the present invention). These analytics can be obtained from database (e.g., external database) through the use of one or more APIs. At step 935, the processes and/or systems draw the turnover rate circles about the work location. At this stage, the analytics can then post (determine) a percentage of turnover for each of the concentrically placed circles.

At step 940, a determination is made as to whether a new work location will be entered. If not, the processes end at step 945. If a new work location is to be entered then, at step 950, a user enters a new work location. The new work location is then plotted onto the map at step 955 and, upon selection of the new work location, the processes will continue to step 910.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method implemented in a computer system, the method comprising:
    extracting address information of a plurality of employees from a database using an application programming interface (API);
    converting the extracted address information of the plurality of employees into longitudinal and latitudinal coordinates corresponding to the plurality of employees using a geocode service API;
    using a mapping module, by the computer system, to map the longitudinal and latitudinal coordinates corresponding to the plurality of employees and a work location onto a map, the map being visually displayed on a display device of the computer system and showing a predefined geographic location encompassing the work location surrounded by the longitudinal and latitudinal coordinates of the address information;

receiving, by the computer system, a selection of the work location;

obtaining, by the computer system, calculated analytics data of employee turnover rate for the plurality of employees based on a commute distance from the work location to each of the longitudinal and latitudinal coordinates of the plurality of employees;

in response to the computer system receiving the selection of the work location, using the mapping module to graphically overlay the analytics data of the turnover rate for the plurality of employees onto the map to provide a graphical representation of employee turnover rate for different segments of the map displayed on the display device, using the mapping module, by the computer system, to plot additional information onto the map displayed on the display device including at least forming lines connecting each of the longitudinal and latitudinal coordinates of each employee to the work location, wherein the lines connecting each of the employees to the work location signify different metrics associated with each of the employees, wherein the different metrics are represented, respectively, by at least one of different colors for the lines and different types of dashed lines for the lines displayed on the display device, wherein the additional information further includes a plurality of concentric circles at certain radii from the work location that are displayed on the display device, and employee turnover rate is calculated and graphically shown for each of the concentric circles on the display device based on the longitudinal and latitudinal coordinates falling within each of the concentric circles, and wherein a center of the concentric circles corresponds to the selected work location, and wherein the longitudinal and latitudinal coordinates fall within each of the concentric circles such that a predictive model is created to determine how many employees would have terminated employment based on a commute distance from the selected work location; and determining, by the computer system, a location of a new work site based on the longitudinal and latitudinal coordinates of a number of employees being within the concentric circles around the new work site.

2. The method of claim 1, wherein the obtaining of the analytics of the turnover rate is extracted from a database using an API.

3. The method of claim 1, wherein the map is obtained through a JavaScript charting library and the latitudinal and longitudinal coordinates is plotted onto the map using a geo-JSON specification.

4. The method of claim 1, further comprising using a jQuery to plot additional information onto the map.

5. The method of claim 1, wherein the employee turnover rate is represented as a percentage of termination within each of the concentric circles.

6. The method of claim 1, wherein the different metrics comprise employee status including at least one of new hire, current employee, terminated employee and employment information.

7. A computer system comprising:
a hardware memory device that stores program instructions; and a processor that executes the program instructions and causes the computer system to:

extract address information of a plurality of employees from a database using an application programming interface (API);

convert the extracted address information of the plurality of employees into longitudinal and latitudinal coordinates corresponding to the plurality of employees using a geocode service API;

use a mapping module to map the longitudinal and latitudinal coordinates corresponding to the plurality of employees and a work location onto a map, the map being visually displayed on a display device of the computer system, in response to the computer system receiving a selection of the work location;

extract analytics data of employee turnover rate for the plurality of employees associated with a commute distance from the work location to each of the longitudinal and latitudinal coordinates of the plurality of employees;

use the mapping module to generate an overlay of the extracted analytics data on the map displayed on the display device, the overlay graphically representing employee turnover rate for different segments of the map centered about the work location, wherein:

the program instructions are stored on computer readable storage medium for execution by a CPU via computer readable memory, the processor that executes the program instructions causes the computer system to use the mapping module to further plot additional information onto the map displayed on the display device including a plurality of concentric circles at certain radii from the work location which is representative of the different segments of the map centered about the work location, employee turnover rate is calculated and graphically shown on the map displayed on the display device for each of the concentric circles based on the longitudinal and latitudinal coordinates falling within each of the concentric circles, the concentric circles correspond to a selected work location, the longitudinal and latitudinal coordinates are plotted with respect to the concentric circles, the longitudinal and latitudinal coordinates fall within each of the concentric circles such that a predictive model is created to determine how many employees would have terminated employment based on a commute distance from the selected work location;

the processor that executes the program instructions causes the computer system to further calculate and graphically show using the mapping module, in an overlay format on the map displayed on the display device, how many employees would have terminated employment based on a commute distance from the selected work location; and the processor that executes the program instructions further causes the computer system to determine a location of a new work site based on the longitudinal and latitudinal coordinates of a number of employees being within the concentric circles around the new work site.

8. The computer system of claim 7, wherein the analytics of the turnover rate and employee information including the address information is extracted from a database using one or more APIs.

9. The computer system of claim 7, wherein the map is obtained through a JavaScript charting library and the latitudinal and longitudinal coordinates is plotted onto the map using a geo-JSON specification.

10. The computer system of claim 9, wherein the processor that executes the program instructions causes the computer system to further plot additional information onto the map including at least a line connecting each of the longitudinal and latitudinal coordinates of each employee to the work location.

11. The computer system of claim 10, wherein the lines connecting each of the employees to the work location signifies different metrics associated with each of the employees.

12. A computer program product comprising computer readable program instructions stored on non-transitory computer readable storage medium, the computer readable program instructions causing a computing device to:

extract address information of a plurality of employees from a database using one or more service APIs;

convert the address information into longitudinal and latitudinal coordinates using geocode service APIs;

upon selection of a selectable work location provided on a map, the map being visually displayed on a display device of the computer system:

plot the longitudinal and latitudinal coordinates of the plurality of employees onto the map displayed on the display device, surrounding the selectable work location;

extract an employee termination rate for the plurality of employees associated with a commute distance from the work location to each of the longitudinal and latitudinal coordinates of the plurality of employees;

draw defined segments on the map, displayed on the display device, which centers about the selectable work location and which includes at least some of the longitudinal and latitudinal coordinates within the defined segments;

post data of the turnover rate for each segment of the map displayed on the display device graphically showing a percentage of the employee termination rate for each segment based on the commute distance, plot additional information onto the map displayed on the display device including at least forming lines connecting each of the longitudinal and latitudinal coordinates of each employee to the work location, wherein the lines connecting each of the employees to the work location signify different metrics associated with each of the employees, wherein the additional information further includes a plurality of concentric circles at certain radii from the work location that are displayed on the display device and employee turnover rate is calculated and graphically shown for each of the concentric circles on the display device based on the longitudinal and latitudinal coordinates falling within each of the concentric circles, and wherein the concentric circles correspond to a selected work location, and wherein the longitudinal and latitudinal coordinates fall within each of the concentric circles such that a predictive model is created to determine how many employees would have terminated employment based on a commute distance from the selected work location; and determine a location of a new work site when the longitudinal and latitudinal coordinates of a number of employees are within the concentric circles around the new work site.

13. The method of claim 12, wherein the different metrics comprise employee status including at least one of new hire, current employee, terminated employee and employment information.

14. The method of claim 12, wherein the different metrics are represented, respectively, by at least one of different colors for the lines and different types of dashed lines for the lines.

* * * * *